(12) United States Patent
Sawamoto et al.

(10) Patent No.: US 7,491,302 B2
(45) Date of Patent: Feb. 17, 2009

(54) ELECTROLYTIC GAS GENERATION METHOD AND ELECTROLYTIC GAS GENERATION DEVICE

(75) Inventors: Isao Sawamoto, Iwaki (JP); Takazou Hirose, Atsugi (JP); Takayuki Jizaimaru, Atsugi (JP)

(73) Assignees: Nomura Micro Science Co., Ltd., Atsugi-shi, Kanagawa (JP); COA Technology Co., Ltd., Iwaki-shi, Fukushima (JP)

( * ) Notice: Subject to any disclaimer, the term of this patent is extended or adjusted under 35 U.S.C. 154(b) by 484 days.

(21) Appl. No.: 10/815,587

(22) Filed: Apr. 1, 2004

(65) Prior Publication Data

US 2004/0232004 A1    Nov. 25, 2004

(30) Foreign Application Priority Data

May 23, 2003    (JP)    ............................ 2003-146056

(51) Int. Cl.
*C25B 9/10*     (2006.01)
*C02F 1/467*    (2006.01)
*C25B 1/13*     (2006.01)

(52) U.S. Cl. .................................. 204/233; 204/263

(58) Field of Classification Search ................. None
See application file for complete search history.

(56) References Cited

U.S. PATENT DOCUMENTS 5,407,550 A * 4/1995 Shimamune et al. ........ 204/283
5,720,869 A * 2/1998 Yamanaka et al. .......... 210/638
6,164,632 A * 12/2000 Uchida et al. ............... 261/102

FOREIGN PATENT DOCUMENTS

JP    2002-166279    6/2002

OTHER PUBLICATIONS

"Carbonic acid", from "http://en.wikipedia.org/wiki/Carbonic_acid", Jun. 2007.*
"Carbonated water", from "http://en.wikipedia.org/wiki/Carbonated_water", Jun. 2007.*

* cited by examiner

*Primary Examiner*—Harry D Wilkins, III
(74) *Attorney, Agent, or Firm*—Flynn, Thiel, Boutell & Tanis, P.C.

(57) ABSTRACT

Pure water 3 is made to pass through a carbon dioxide contact mechanism, to become carbonated water, and is supplied to an ozone gas and hydrogen gas generation section, so that the concentration of generated ozone gas becomes stable. As a result, the concentration of the generated ozone gas is high and stable, and a high concentration can be maintained.

3 Claims, 1 Drawing Sheet

ELECTROLYTIC GAS GENERATION METHOD AND ELECTROLYTIC GAS GENERATION DEVICE

BACKGROUND OF THE INVENTION

1. Field of the Invention

The present invention relates to an electrolytic gas generation method and electrolytic gas generation device for generating ozone gas by electrolysis, and more specifically, relates to an electrolytic gas generation method and electrolytic gas generation device for making ozone generation more stable and for generating high concentration ozone gas.

2. Description of the Related Art

Generation of ozone gas by electrolyzing water has been performed from more than 100 years. Formerly, dissolution and electrolysis for electrolyzing a solution including an anion having a high electronegativity to generate ozone was used. However, with the recent development of solid polyelectrolytes, an ozone generation device which uses electrolysis of water using the solid polyelectrolyte has been produced and put on the market.

Electrolysis of water using a so-called zero cap method, in which a perfluorocarbon sulfonate type cation-exchanger membrane is used as a solid electrolyte, and an anode and a cathode are closely arranged on the opposite sides thereof, has a simple structure and is easy to handle, having no corrosiveness except in the case of the ozone gas. Therefore, this method becomes dominant in the recent ozone generation by the electrolysis of water.

The concentration of ozone gas is about 20%, with the remainder being oxygen gas containing saturated vapor, and hence the ozone gas is a mixed gas of ozone and oxygen and hardly contains impurities.

Therefore, the use of ozone has been widely spread not only in the field of sterilization but also in the field of washing semiconductors recently. There is a disadvantage in that the power consumption slightly increases, as compared with a silent discharge method in which ozone is generated by using oxygen as a raw material, and applying a high frequency voltage thereto, but since the ozone gas concentration is high, its solubility in ultrapure water is high, giving an advantage in that high purity and high concentration ozone can be easily produced.

However, as the density of a semiconductor increases, microfabrication is required and, particularly, requests for washing accuracy has increased recently.

Moreover, the water quality of ultrapure water is improved with microfabrication, and ultrapure water without containing metals or organic matter at all has been generated and used.

In ozone generation by electrolysis, a change in the water quality of pure water, being, still now, a raw material, affects the ozone gas generation, thereby causing a change in a bath voltage, and a fluctuation in the ozone gas concentration.

Particularly, a fluctuation in the ozone gas concentration causes an instability in washing, and becomes a cause of insufficient washing. Therefore, stability in the ozone gas concentration has been strongly demanded (for example, see Japanese Patent Publication No. 2002-166279, pp 1 to 5, FIGS. 1 to 2).

SUMMARY OF THE INVENTION

The present invention has been achieved in order to solve the above problems in the related art. It is an object of the present invention to provide an electrolytic gas generation method and an electrolytic gas generation device that can provide high concentration ozone continuously over a long period and stably at all times.

In order to solve the above problems and achieve the above object, the present invention is constituted as described below.

The electrolytic gas generation method according to the present invention is an electrolytic gas generation method in which a porous anodic substance and cathodic substance are respectively arranged close to the opposite sides of an ion exchange film, and the ion exchange film serves as a solid electrolyte, to produce ozone gas and oxygen gas from the anode side, and hydrogen gas from the cathode side, wherein carbon dioxide is brought into contact with a conduit pipe of pure water supplied to the anode side, so as to supply the pure water as carbonated water.

The electrolytic gas generation method according to the present invention is an electrolytic gas generation method in which the porous anodic substance and cathodic substance are respectively arranged close to the opposite sides of an ion exchange film, and the ion exchange film serves as a solid electrolyte, to produce ozone gas and oxygen gas from the anode side, and hydrogen gas from the cathode side, wherein carbon dioxide is brought into contact with pure water supplied to the anode side, so as to supply the pure water as carbonated water containing carbon dioxide.

The electrolytic gas generation device according to the present invention is an electrolytic gas generation device in which a porous anodic substance and cathodic substance are respectively arranged close to the opposite sides of an ion exchange film, and the ion exchange film serves as a solid electrolyte, to produce ozone gas and oxygen gas from the anode side, and hydrogen gas from the cathode side, wherein the device has a structure such that carbon dioxide is brought into contact with pure water supplied to the anode side so that the pure water becomes carbonated water containing carbon dioxide.

The present invention will be described in detail below.

For example, if ultrapure water of 18.25 M$\Omega$ which does not contain metals or organic matter at all is supplied to an electrolytic gas generation device, in which a porous anodic substance and cathodic substance are respectively arranged close to the opposite sides of an ion exchange film, and the ion exchange film serves as a solid electrolyte, to produce ozone gas and oxygen gas from the anode side, and hydrogen gas from the cathode side, to cause electrolysis, the generation efficiency of the ozone gas is only 10%.

According to the present invention, in the electrolytic gas generation device in which the porous anodic substance and cathodic substance are respectively arranged close to the opposite sides of an ion exchange film, and the ion exchange film serves as a solid electrolyte, to produce ozone gas and oxygen gas from the anode side, and hydrogen gas from the cathode side, carbon dioxide is brought into contact with pure water supplied to the anode side, so that the pure water becomes carbonated water. As a result, a fluctuation in concentration of the generated ozone gas is suppressed, thereby enabling stable ozone generation.

Conditions relating to the electrolytic gas generation device according to the present invention will be described in detail below.

In electrolytic gas generation in which ozone gas and oxygen gas are produced from the anode side, and hydrogen gas is produced from the cathode side, it is necessary to perform gas-liquid separation for separating the raw material water and the generated gas on the anode side. However, the concentration of the ozone gas is determined by the ozone concentration in the water during the gas-liquid separation. The source of the water is the supplied pure water, and it is no exaggeration to say that the concentration of the ozone gas is affected by metals and impurities in the pure water.

The specific resistance in normal city water is from $1/100$ to $1/200$ MΩcm, but the pure water herein stands for water having a purity of not lower than 1 MΩcm by removing metal contamination therein.

In the electrolytic gas generation device, pure water in the installation site is used as the raw material pure water. The pure water is not generated for ozone generation, but generated for washing. Therefore, the specification thereof is for satisfying the washing condition.

In the recent manufacturing of liquid crystals and semiconductors, there is a demand for increasing the purity of pure water, and the purity of pure water is now generally 18 MΩcm, and not larger than 10 ppb in TOC, by considerably removing metals and organic matter.

When such pure water is supplied to the anode side, since the organic matter content in the pure water is slight, ozone is decomposed, and hence the concentration of the ozone gas does not increase.

On the other hand, as microfabrication of semiconductors advances, as in the recent semiconductor manufacturing, and the water quality of pure water is also improved, ultrapure water which does not contain metals or organic matter at all is generated and used.

In the case of such ultrapure water, as a general method of removing the organic matter completely, there is used a system in which a large quantity of pure water is processed and circulated, and a small quantity of ultrapure water is used therefrom.

Generally, UV sterilization is used for such processing, and hence the ultrapure water is inevitably subjected to the UV sterilization. Due to the UV sterilization, hydrogen peroxide remains in the ultrapure water.

When such ultrapure water is supplied to the anode side, ozone is consumed by the hydrogen peroxide remaining in the ultrapure water, and hence the concentration of ozone gas does not increase.

As described above, in the conventional electrolytic ozone generation, ozone generation in electrolysis is affected delicately by components other than metal contamination in the pure water.

In the present invention, as a method of generating high concentration ozone gas easily and stably, a mechanism is provided, in which carbon dioxide is brought into contact with pure water supplied to the anode side, so that the pure water becomes carbonated water. Therefore, the pure water is changed to carbonated water or carbonated water containing carbon dioxide, and supplied to the anode side.

In the case of pure water having a high purity, the pure water comes in contact with the carbon dioxide to become carbonated water, and then is supplied to the anode side as carbonated water. Therefore, the pH decreases to prevent ozone decomposition in the ozone generated in the anode, and hence the ozone concentration does not decrease.

In the case of pure water containing hydrogen peroxide, hydrogen peroxide in the pure water is stripped by carbon dioxide and supplied to the anode side. Therefore, the ozone generated in the anode is not consumed by hydrogen peroxide in the pure water.

Moreover, before the pure water comes in contact with carbon dioxide to become carbonated water, the pure water may again be brought into contact with ozone gas to become ozone water, and then brought into contact with carbon dioxide, and supplied as carbonated water. As a result, in the case of pure water containing hydrogen peroxide, hydrogen peroxide in the pure water is once oxidation-analyzed by the ozone gas, and then supplied to the anode side as stable water having a low pH due to carbon dioxide. Therefore, ozone generated in the anode is not affected by the pure water, thereby enabling generation of high concentration ozone gas.

The quantity of carbon dioxide brought into contact with the pure water supplied to the anode side, before being supplied, should be controlled to be in the range of from 0.5 to 15% with respect to the generated gases of ozone and oxygen. If the quantity is less than the above range, the pH does not drop, and hence the ozone generation is not stable. If the quantity thereof exceeds 15%, the ozone water in the anode chamber is stripped by the carbon dioxide, and hence the ozone gas concentration does not increase. Moreover, in order to maintain the high ozone gas concentration stably, it is desired that the quantity of carbon dioxide be in the range of from 2.5 to 10% with respect to the generated gases of ozone and oxygen.

At the same time, when ozone water is generated by using the ozone gas, the ozone water may become high concentration ozone water according to the condition, and even if the ozone water is made to flow in the piping for 50 meters or longer, the concentration of ozone water is not attenuated. As a result, the ozone water flows in the piping as ozone water having a blue color. By measuring and calculating this color, the quantity of carbon dioxide may be determined automatically.

There are various methods for bringing carbon dioxide into contact with the pure water being supplied to the anode side. Generally, there can be considered a method in which carbon dioxide is mixed in a pure water stream by an ejector or a static mixer, a method in which carbon dioxide is diffused from a diffusing plate so that the carbon dioxide is dissolved in the pure water, and a method in which a film is used, and pure water is introduced to one side of the film, and carbon dioxide is introduced to the other side thereof, so that carbon dioxide is dissolved in the pure water via the film.

In the contact method of the pure water and carbon dioxide, it is desired to use the method in which pure water is introduced to one side of the film, and carbon dioxide is introduced to the other side thereof, so that carbon dioxide is dissolved in the pure water via the film, from a viewpoint of avoiding contamination as much as possible.

Recently, there is also used ultrapure water in which nitrogen is diffused in pure water to cause deoxidation, and ultrapure water in which gas in ultrapure water is removed by a vacuum (degassed ultrapure water), as well as the ultrapure water containing the residual hydrogen peroxide.

With respect to these pure waters, if the above-described mechanism is provided, the pure water becomes pure water containing dissolved carbon dioxide before being supplied, and hence a decrease in the ozone gas generation due to the supplied pure water does not occur. Moreover, since the quantity of pure water supplied and used with respect to 1 g of ozone gas generated by electrolysis is as small as about 50 cc, the quantity of carbon dioxide required for the mechanism is also small.

DESCRIPTION OF THE PREFERRED EMBODIMENTS

One example of the embodiment according to the present invention is explained below.

Figure 1:
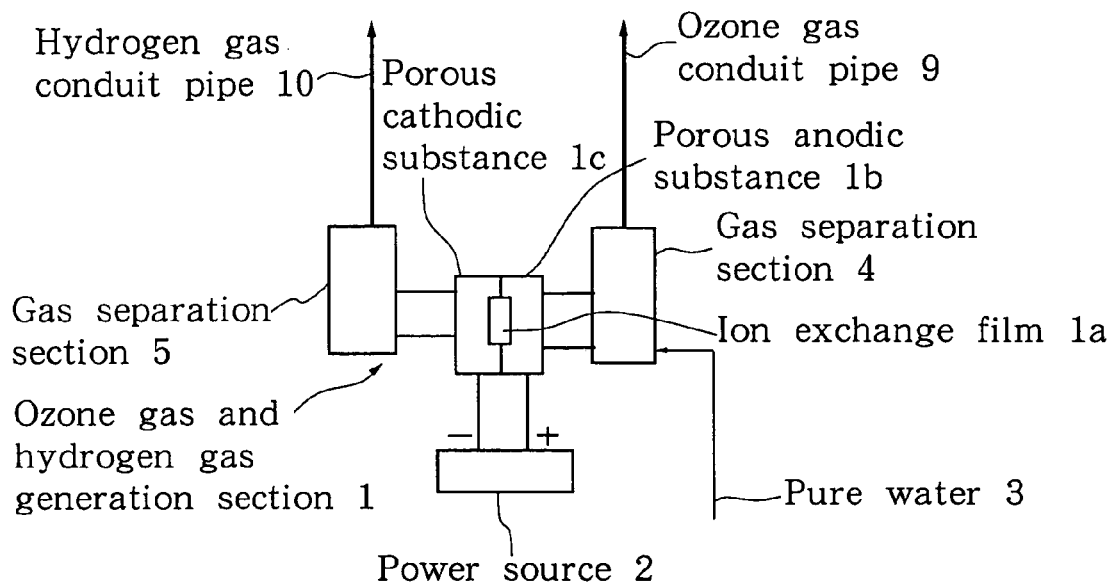
FIG. 1 is a conceptual diagram of a general electrolytic gas generation device.
Figure 2:
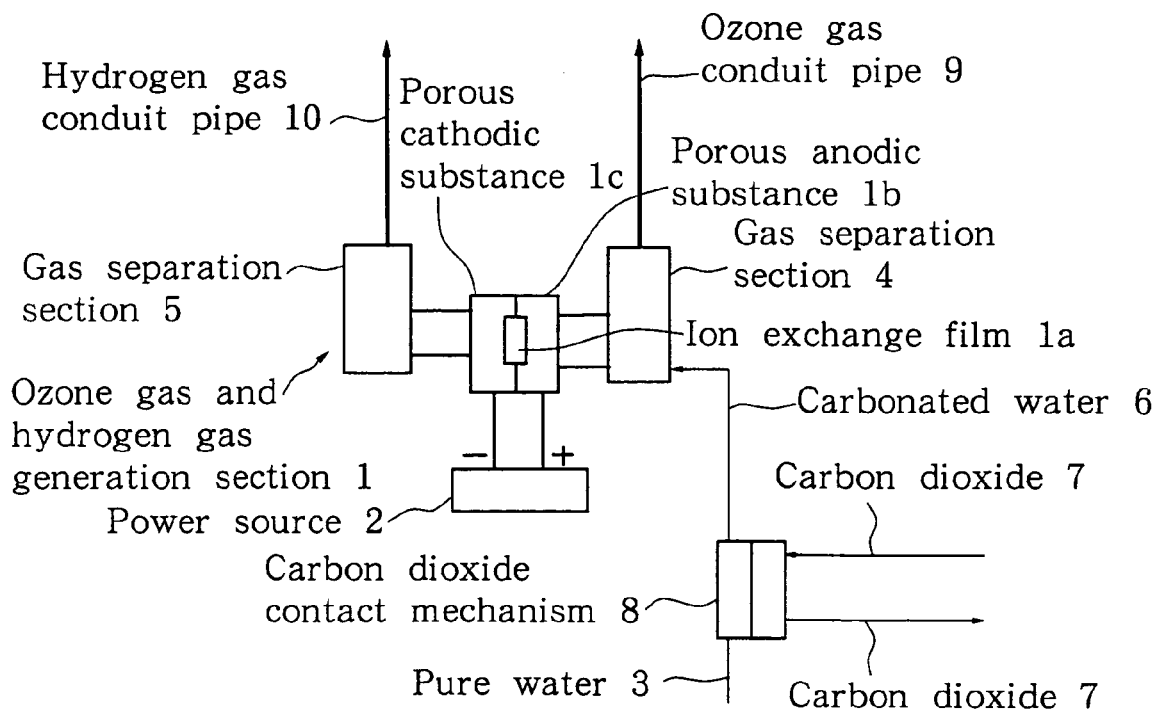
FIG. 2 is a conceptual diagram of an electrolytic gas generation device according to the embodiment of the present invention, in which a carbon dioxide contact mechanism is provided in piping of pure water supplied to the anode side.

FIG. 1 is a conceptual diagram of general electrolytic gas generation device, and FIG. 2 is a conceptual diagram of electrolytic gas generation device according to the embodiment of the present invention, in which a mechanism for bringing carbon dioxide into contact with supplied pure water is incorporated.

In FIG. 1, in an ozone gas and hydrogen gas generation section 1 in the electrolytic gas generation device, an ion exchange film 1a is provided. Porous anodic substance 1b and porous cathodic substance 1c are respectively arranged close to the opposite sides of the ion exchange film 1a, and the ion exchange film 1a serves as a solid electrolyte, to produce ozone gas and oxygen gas from the anode side, and hydrogen gas from the cathode side.

Pure water 3 is supplied to the ozone gas and hydrogen gas generation section 1. A power source 2 is connected to the generation section 1, and gas is generated by an electric current from the power source 2.

The generated ozone gas and hydrogen gas are separated by gas separation sections 4 and 5, respectively, and guided to an ozone gas conduit pipe 9 and a hydrogen gas conduit pipe 10.

In FIG. 2, pure water 3 is made to pass through a carbon dioxide contact mechanism 8, to become carbonated water 6, and is supplied to the ozone gas and hydrogen gas generation section 1 in the electrolytic gas generation device. The power source 2 is connected to the ozone gas and hydrogen gas generation section 1, and gas is generated by an electric current from the power source 2.

Pure water 3 is supplied to one side of the carbon dioxide contact mechanism 8, and carbon dioxide 7 is supplied to the other side thereof, via a film. The generated ozone and hydrogen gas are separated by the gas separation sections 4 and 5, respectively, and guided to the ozone gas conduit pipe 9 and a hydrogen gas conduit pipe 10, as in the same manner shown in FIG. 1.

Examples of the ozone generation device according to the present invention will be described below, but the present invention is not limited thereto.

Example 1

Ultrapure water containing 500 ppb of residual hydrogen peroxide was used as pure water to be supplied to an anode chamber. The pure water was made to pass through a solid electrolyte, in which a porous anodic substance and cathodic substance were respectively arranged on the opposite sides thereof, and carbon dioxide was brought into contact with the pure water at a rate of 1.4 liter/h, via a PTFE film in a conduit pipe, and was guided to the anode chamber.

Electrolysis was performed by supplying 150 A from a power source. The quantity of ozone gas generated from the anode was 8.4 g/hr. Electrolysis was performed for one month under the same condition, and there was no change in the quantity of ozone gas.

Comparative Example 1

Electrolysis was performed under the same condition as in Example 1, except that the mechanism in which carbon dioxide gas was brought into contact with the pure water supplied to the anode chamber was not used.

The quantity of ozone gas generated from the anode was 2.7 g/hr, which showed a decrease to one third of that in Example 1. Electrolysis was performed for one month under the same condition as in Example 1, but the quantity of ozone gas did not increase, and there was no change in the quantity of ozone gas.

Example 2

Pure water containing 1 ppb of organic matter was used as pure water to be supplied to an anode chamber. The pure water was made to pass through a solid electrolyte, in which a porous anodic substance and cathodic substance were respectively arranged on the opposite sides thereof, and carbon dioxide was brought into contact with the pure water at a rate of 1.4 liter/h, via a PTFE film in a conduit pipe, and was guided to the anode chamber. Electrolysis was performed by supplying 150 A from a power source. The quantity of ozone gas generated from the anode was 8.4 g/hr. Electrolysis was performed for one month under the same condition, and there was no change in the quantity of ozone gas.

Comparative Example 2

Electrolysis was performed under the same condition as in Example 2, except that the mechanism in which carbon dioxide was brought into contact with the pure water supplied to the anode chamber was not used.

The quantity of ozone gas generated from the anode was 4.5 g/hr, which showed a decrease to half the quantity compared with Example 2. Electrolysis was performed for one month under the same condition as in Example 2, but the quantity of ozone gas did not increase, and there was no change in the quantity of ozone gas.

Example 3

Ozone water was generated by using the ozone gas generated in Example 2. Pure water used for generating ozone water was the same as in Example 2, and the purity thereof was 1 ppb. When the quantity of pure water was 0.6 liter/m, the concentration of the ozone water was 120 mg/l immediately after dissolution, and there was hardly any change at 50 meters ahead. Vivid blue coloration was shown through the piping.

Comparative Example 3

Ozone water was generated under the same condition as in Example 3, except that the mechanism in which carbon dioxide was brought into contact with the pure water supplied to the anode chamber was not used.

The concentration of ozone water was 75 mg/l immediately after dissolution, but attenuated to 45 mg/l at 50 meters ahead. There was no indication of blue coloration through the piping.

As described above, according to the present invention, ozone gas and oxygen gas are produced from the anode side, and hydrogen gas is produced from the cathode side. At this time, ozone gas and/or ozone water having stable ozone concentration at all times can be supplied.

Moreover, ozone gas and ozone water can be generated at high concentration at all times.

Furthermore, in generating ozone water at a high concentration by pure water having a high purity, a low cost and compact electrolytic gas generation device can be obtained.

What is claimed is:

1. An electrolytic gas generation device for generating ozone gas consisting essentially of: an anode chamber in which the ozone gas and oxygen is generated; a cathode chamber in which hydrogen gas is generated; a solid electrolyte ion exchange film separating the anode chamber from the cathode chamber; a porous anode provided at a first side of the ion exchange film in the anode chamber; a porous cathode provided at an opposite side of the ion exchange film in the cathode chamber; a power source for imposing a potential difference between the porous anode and the porous cathode; a pure water supply source for supplying pure water to a mixer; a carbon dioxide supply source for supplying carbon dioxide to the mixer; and the mixer for mixing the pure water and the carbon dioxide to form carbonated water and supplying the carbonated water to the anode chamber.

2. An electrolytic gas generation device according to claim 1, wherein the mixing means in which the pure water is changed to carbonated water is such that pure water is introduced to one side of a film and carbon dioxide is introduced to an opposite side of the film, so that the carbon dioxide dissolves in the pure water via said film to change the pure water to carbonated water.

3. An electrolytic gas generation device according to claim 1, wherein the carbonated water contains carbon dioxide.

* * * * *